United States Patent [19]

Webb, Jr.

[11] 3,929,985

[45] Dec. 30, 1975

[54] ANHYDROUS CANDICIDIN FOAM COMPOSITIONS

[75] Inventor: Norval Ellsworth Webb, Jr., Cincinnati, Ohio

[73] Assignee: Richardson-Merrell Inc., Wilton, Conn.

[22] Filed: Jan. 18, 1974

[21] Appl. No.: 434,391

[52] U.S. Cl. ............................ 424/45; 424/122
[51] Int. Cl.² ...................................... A61K 9/14
[58] Field of Search .................................. 424/45

[56] References Cited
UNITED STATES PATENTS

| 3,092,555 | 6/1963 | Horn | 424/45 |
| 3,244,589 | 4/1966 | Sunnen | 424/45 |
| 3,384,541 | 5/1968 | Clark | 424/45 |
| 3,574,821 | 4/1971 | Pfirrmann et al. | 424/45 |
| 3,751,562 | 8/1973 | Nichols | 424/45 |

FOREIGN PATENTS OR APPLICATIONS

| 1,026,831 | 4/1966 | United Kingdom | 424/45 |

OTHER PUBLICATIONS

Physician's Desk Reference, (PDR), 1971, p. 701–702, 747, 1198.

*Primary Examiner*—Norman A. Drezin
*Attorney, Agent, or Firm*—William J. Stein; Eugene O. Retter; George W. Rauchfuss, Jr.

[57] ABSTRACT

Stable, anhydrous, foam compositions containing candicidin useful in the treatment of vaginitis.

3 Claims, No Drawings

ANHYDROUS CANDICIDIN FOAM COMPOSITIONS

FIELD OF THE INVENTION

This invention relates to novel anhydrous therapeutic compositions of candicidin which can be dispensed as pressurized foams.

BACKGROUND OF THE INVENTION

Candicidin is a conjugated heptaene antibiotic complex produced by a soil actinomycetes similar to *Streptomyces griseus*. This antibiotic has long been found useful for the treatment of vaginitis due to infections caused by *Candida albicans* and other Candida species. Prior to the present invention such infections were treated topically by means of vaginal tablets and vaginal ointments. Alternatively, such infections have been treated systemically.

Vaginal tablets are unpleasant to administer. Additionally, the antibiotic is not always released in a reproducible and predictable manner inasmuch as its release is directly dependent upon the disintegration of the tablet in the vagina. Vaginal ointments produce a sensation of warmth when applied due to the inhibition of normal moisture evaporation. In addition, they feel greasy and tacky and have a tendency to stain the underclothing.

The present invention overcomes these disadvantages and provides a convenient means of vaginal administration in the form of a stable, non-aqueous, aerosol foam which readily breaks at body temperatures and spreads as a uniform film along the walls of the vagina. These compositions are cosmetically superior to those presently available and provide a readily available controlled dosage directly at the situs of inflammation. The need for such formulations has long been recognized but remained unsolved primarily due to the difficulties experienced in formulating candicidin compositions.

Candicidin, encompassing a complex or a mixture of related antibiotics, is relatively unstable and undergoes degradation with a concomitant loss in activity. Thus, when exposed to the action of such physical and chemical agents as heat, light, oxygen and moisture, there is a concomitant loss in activity. Another object of this invention, therefore, is to provide anhydrous dosage forms wherein the candicidin retains its stability over long periods of time.

SUMMARY OF THE INVENTION

This invention relates to novel therapeutic compositions of candicidin. More particularly, this invention relates to anhydrous, aerosol foam compositions comprising:
a. from 0.2 to 0.5% by weight of candicidin;
b. from 2 to 5% by weight of a polyoxyethylated high molecular weight fatty alcohol;
c. from 0.5 to 2.0% by weight of a nonionic surfactant;
d. from 0.05 to 1.0% by weight of an antioxidant;
e. from 5.0 to 20.0% by weight of an aerosol propellant selected from the group of chlorofluorohydrocarbons having a boiling point between −30°C. and 30°C. in a propylene glycol solvent.

DETAILED DESCRIPTION OF THE INVENTION

In general the novel pressurized compositions of this invention contain the antibiotic candicidin, a foaming agent, a nonionic surfactant and a propellant contained in a vehicle of propylene glycol. These mixtures have certain critical features both with respect to the nature and amount of the various components employed. When prepared in the manner described, these compositions retain their activity over long periods of time and produce homogenous, creamy foams that are particularly useful in the treatment of vaginitis.

Candicidin is an antifungal polyene antibiotic complex, fully described in U.S. Pat. No. 2,992,162. As recovered from culture filtrates the complex consists of three fractions, designated Candicidin A, B and C. The A fraction is a reddish brown powder soluble in water and is simply the sodium salt of B, a greenish powder which is water insoluble. Fraction C appears to be a degradation product which, relatively speaking, is biologically inactive. Candicidin is particularly useful for topical treatment of vaginal candidiasis (moniliasis). Candicidin, however, is not very stable and formulations thereof are generally kept in dark, refrigerated, air-tight containers to prevent loss of activity. The present invention provides formulations which retain as much as 95% of their original antibiotic activity when kept at 4°C. over a 1-year period.

Both the nature and the amount of foaming agent employed are critical with respect to the solvent vehicle utilized. Various nonionic and emulsifying agents, including the condensation products of ethylene oxide and organic acids were tried unsatisfactorily, forming either foams that were unstable or failing to produce any foams whatsoever.

I have discovered that the reaction products of ethylene oxide and the higher fatty alcohols, marketed as "Polawax," produce thick, uniform, creamy foams with candicidin which are quite stable at room temperature. Furthermore, when warmed to 37°C. (body temperature) these foams have the surprising property of flattening out to form a fluid cream with the antibiotic. This characteristic of the foams described herein is highly desirable and can be utilized in the preparation of other vaginal foam products. The soft, cushiony foams which are produced can be safely introduced into the vagina and, after warming to body temperature, will flatten leaving a thin film of the medicament evenly distributed along the vaginal walls. The ethylene oxide and higher fatty alcohol reaction products are creamy, wax-like, nonionic, emulsifying waxes having a melting range of 48°–52°C., a maximum iodine value of 3.5 and a maximum saponification value of 14. The foaming agent of choice is the reaction product of ethylene oxide with stearyl alcohol. Various amounts of the foaming agent are added to the present compositions, preferably ranging from 2 to 5% by weight of the total composition. Amounts beyond 5% provide stiff foams which are too stable and which do not break upon warming. On the other hand, amounts below 2% provide loose, wet foams, which break too rapidly and which have a tendency to run.

Candicidin is insoluble in water and ethanol but is soluble in various organic solvents such as butanol, ethylene glycol, various lower molecular weight polyethylene glycols and glycerine. Butanol and ethylene glycol are unsuitable for pharmaceutical use due to their toxicity. Glycerine is non-toxic but very hygroscopic. Solutions of glycerine above 10% cause a burning sensation with the sensitive vaginal mucous membranes due to their dehydrating nature. In addition, candicidin lacks the requisite stability in various mixtures of polyethylene glycols tested. Surprisingly, anhydrous propylene glycol was found to be effective. Propylene glycol is non-hygroscopic, non-toxic, pharmaceutically acceptable and dissolves sufficient candicidin to be therapeutically useful. Most importantly, the stability of candicidin is preserved in anhydrous propylene glycol solutions.

Candicidin is an amorphous, non-wettable, electrostatic powder. A surfactant is necessary to stabilize these compositions by preventing agglomeration and evenly dispersing the candicidin in the solvent vehicle so that solution can occur. Nonionic surfactants are utilized because of their pharmacological compatibility and their lack of irritation and toxicity. The preferred nonionic surfactants are the fatty acid partial esters of sorbitol anhydride, such as serbitan monooleate marketed as Spans, which are prepared by the esterification of sorbitan with a fatty acid such as oleic or stearic acid. Additionally, the polyoxyethylene derivatives of fatty acid partial esters of sorbitol anhydrides, marketed as Tweens, are useful. The nonionic surfactant of choice is the oleate ester of sorbitol and its anhydride, which has been copolymerized with approximately 20 moles of ethylene oxide for each mole of sorbitol and sorbitan anhydride. This particular nonionic surfactant accelerates the dispersion of the otherwise particulate agglomerate of candicidin and aids in the desegregation and stabilization of candicidin in the aerosol container with relative ease. The amount of surfactant necessary to prevent agglomeration is not critical. Generally the surfactant is present in an amount ranging from 0.5 to 2.0% by weight of the total composition. Preferably, a concentration of about 1.0% by weight is employed.

Due to the relative ease with which candicidin undergoes oxidative degradation, it is necessary to add an antioxidant to the present compositions. The complexity of free radical oxidative processes and their sensitivity to trace amounts of impurities present critically affects both the nature and the amount of antioxidant to be used. The use of propyl gallate as an antioxidant in the propylene glycol system of the present invention has been found to be superior to all other antioxidants tried. Surprisingly, candicidin activity rapidly diminishes with propyl gallate concentrations in excess of 1%, representing the outer limits of usefulness for this antioxidant. On the other hand, a minimum or threshold amount of 0.5% of propyl gallate is found to be necessary. Maximum candicidin stability is obtained with propyl gallate at a concentration of about 0.1% by weight.

The propellant is responsible for developing the necessary pressure within the container and expelling the product once the aerosol valve is opened. The propellants used in this invention are selected from a group of fluorinated hydrocarbons known as "Freons" due to their excellent solubilization characteristics, their compatibility with candicidin and their widespread use in pharmaceutical aerosols. More particularly, those chlorofluorohydrocarbons having a boiling point of from −30° to 30°C. are employed. Specifically enumerated within this group of compounds are dichlorodifluoromethane, dichlorotetrafluoroethane, monochlorodifluoroethane, difluoroethane and octafluorocyclobutane. The propellants are used individually or as mixtures. A preferred propellant mixture consists of a mixture of nine parts of dichlorotetrafluoroethane to one part of dichlorodifluoromethane.

The amount of propellant employed varies with the actual propellants being used. In general, an amount less than 5.0% of propellant by weight will not produce useful results. On the other hand, an amount as high as 20% by weight of propellant can be used with propellants of low vapor pressure. As a preferred embodiment an amount of 10% by weight of a 9:1 mixture of dichlorotetrafluoroethane to dichlorodifluoromethane is employed to gassify the instant foam composition. The propellant can be added to the foam producing composition prior to its addition to the aerosol container which is then capped with a foam valve. Preferably, the foam producing composition is added to an aerosol container, capped with a foam valve and charged through the valve with the propellant on a weight basis.

The compositions of this invention are prepared by dissolving the antioxidant in a solution of the nonionic surfactant to form a nonionic surfactant solution. The candicidin is then added to the nonionic surfactant solution to form a candicidin dispersion. The polyoxyethylated high molecular weight fatty alcohol is dissolved in the propylene glycol to form a propylene glycol solution and the candicidin dispersion prepared is added to the propylene glycol solution to form an anhydrous, foam-producing composition. This composition is placed in a suitable aerosol container, capped with a foam valve and charged with the chlorofluorohydrocarbon propellant mixture.

Additional minor ingredients, such as emollients, perfumes and dyes, may be added to the compositions herein described in order to increase their versatility and attractiveness without fundamentally departing from the nature of this invention. The non-aqueous candicidin pressurized aerosol foam compositions described herein are more particularly illustrated in conjunction with the following specific examples.

EXAMPLE 1

This example illustrates the use of a variety of foaming agents and the effect they have in a polyethylene glycol solvent, having an average molecular weight of 400. In each of the lettered compositions below candicidin is dispersed with the foaming agent and added to the solvent with the aid of gentle heat, if necessary, to effect dispersion. The resulting dispersion was gassed using a mixture of 4 parts of dichlorotetrafluoroethane to 1 part of dichlorodifluoromethane. All numerical values are expressed in grams.

| Components | Compositions | | | | |
| --- | --- | --- | --- | --- | --- |
| | A | B | C | D | E |
| Polyethylene glycol (avg m w 400) | 860 | 86 | 97 | 97 | 97 |
| Polyoxyethylated vegetable oil | 40 | 4 | — | — | — |
| Polyoxyethylated high molecular wt fatty alcohol | — | 3 | 3 | — | — |
| Polyoxyethylene glycol (avg m w 400) monostearate | — | — | — | 3 | — |
| Polyoxyethylene glycol (avg m w 400) distearate | — | — | — | — | 3 |
| Candicidin | 0.73 | 0.073 | 0.04 | 0.04 | 0.04 |
| Type of foam | no foam | stable foam | dry stable foam | no foam | no foam |

EXAMPLE 2

Following essentially the same procedure without the candicidin, the following example illustrates the use of various foaming agents in different solvent vehicles.

| Components | Compositions | | | |
|---|---|---|---|---|
| | A | B | C | D |
| Mineral oil, heavy | 97 | 95 | 40 | — |
| Polyethylene glycol (avg m w 400) | — | — | 40 | 97 |
| Polyoxyethylated high molecular weight fatty alcohol | 3 | 3 | 3 | 3 |
| Polyoxyethylated vegetable oil | — | 2 | 7 | — |
| Type of foam | no foam | no foam | no foam | good foam when cool-breaks upon warming |

EXAMPLE 3

Following essentially the same procedure as in Example II, the following Example illustrates the effect of a foaming agent, polyoxyethylated high molecular weight fatty alcohol, and a nonionic surfactant, the oleate ester of sorbitol and its anhydride copolymerized with ethylene oxide, with various non-aqueous solvent vehicles.

| Components | Compositions | | | |
|---|---|---|---|---|
| | A | B | C | D |
| Polyoxyethylated high molecular weight fatty alcohol | 1.5 | 1.5 | 1.5 | 1.5 |
| Nonionic surfactant | 0.5 | 0.5 | 0.5 | 0.5 |
| Oleyl alcohol q.s. ad. | 50 | — | — | — |
| Polyoxyethylene ether of oleyl alcohol q.s. ad. | — | 50 | — | — |
| Polyethylene glycol dilaurate (avg m w 200) q.s. ad. | — | — | 50 | — |
| Propylene glycol q.s. ad. | — | — | — | 50 |
| Type of foam | no foam | slight foam rapidly breaks | no foam | good white foam |

EXAMPLE 4

The following Example indicates the lack of candicidin stability in a polyethylene glycol solvent foam formulation.

Polyoxyethylated high molecular weight fatty alcohol foaming agent, 3 gms, is melted and dispersed in approximately 97 ml of polyethylene glycol solvent vehicle having an average molecular weight of 400. Candicidin, 0.084 gm, is dispersed in 10 gms of the oleate ester of sorbitol and its anhydride copolymerized with ethylene oxide. The polyethylene glycol solution is added to the candicidin suspension and 75 gm portions filled while still warm in aerosol containers equipped with a foam head. A mixture of 4 parts of dichlorotetrafluoroethane to 1 part of dichlorodifluoromethane is added via the foaming head. Initial recovery of candicidin including control values was only 50.2% and 53.2% of theory.

EXAMPLE 5

The following aerosol foam formulations illustrate the stability of candicidin using various antioxidants with a polyoxyethylated high molecular weight fatty alcohol foaming agent and a nonionic surfactant, such as the oleate ester of sorbitol and its anhydride copolymerized with ethylene oxide. Each composition was gassed with a mixture of 4 parts of dichlorotetrafluoroethane and 1 part of dichlorodifluoromethane.

| Components | Compositions | | | |
|---|---|---|---|---|
| | A | B | C | D |
| Polyoxyethylated high molecular weight fatty alcohol | 2 | 2 | 2 | 2 |
| Butylated hydroxy anisole | 0.01 | — | 0.01 | — |
| Disodium ethylenediaminetetraacetic acid | — | 0.01 | 0.01 | — |
| Propyl gallate | — | — | — | 0.01 |
| Oleate ester of sorbitol | 1 | 1 | 1 | 1 |
| Candicidin | 0.21 | 0.21 | 0.21 | 0.21 |
| Polyethylene glycol (avg m w 400) q.s. ad. | 100 | 100 | 100 | 100 |
| Initial candicidin activity (% Theory) | 71.0 | 69.0 | 76.0 | 80.0 |
| 1 Month at room temperature (% Theory) | — | 38.8 | 41.7 | 41.7 |

Following essentially the same procedure the following results were obtained.

| Components | Compositions | | | |
|---|---|---|---|---|
| | A | B | C | D |
| Polyoxyethylated high molecular weight fatty alcohol | 3 | 3 | 3 | 3 |
| Butylated hydroxy anisole | 0.10 | — | — | — |
| Disodium ethylenediaminetetraacetic acid | — | — | 0.10 | 0.10 |
| Propyl gallate | — | — | 0.10 | 0.50 |
| Oleate ester of sorbitol | 1 | 1 | 1 | 1 |
| Candicidin | 0.21 | 0.21 | 0.21 | 0.21 |
| Polyethylene glycol (avg m w 400) q.s. ad. | 100 | 100 | 100 | 100 |
| Initial candicidin activity (% Theory) | 87.8 | 87.4 | 78.3 | 86.0 |
| 1 Month at room temperature (% Theory) | 45.0 | 41.4 | 45.4 | 44.6 |
| 1 Month at 4°C. - nonpressurized (% Theory) | — | 69.0 | 90.8 | — |

EXAMPLE 6

The following Example illustrates the increased stability of candicidin in a propylene glycol vehicle. All of the samples were gassed with a mixture of 9 parts dichlorotetrafluoroethane and 1 part of dichlorodifluoromethane.

| Components | Compositions | | | | |
|---|---|---|---|---|---|
| | A | B | C | D | E |
| Polyoxyethylated high molecular weight fatty alcohol | 3 | 3 | 3 | 3 | 3 |
| Polyoxyethylene sorbitan monooleate | 1 | 1 | 1 | 1 | 1 |
| Propyl gallate | 0.1 | — | 0.1 | — | — |
| Disodium ethylene diaminetetraacetic acid | — | 0.1 | — | 0.1 | — |
| Candicidin | 0.21 | 0.21 | 0.21 | 0.21 | — |
| Polyethylene glycol (avg mw 400) q.s. ad. | 100 | 100 | — | — | — |
| Propylene glycol q.s. ad. | — | — | 100 | 100 | 100 |
| Initial Candicidin activity (% Theory) | 82.8 | 78.0 | 95.2 | 98.1 | — |

EXAMPLE 7

The following Example illustrates aerosol formulations of candicidin in a propylene glycol solvent vehicle using various antioxidants. All formulations were gassed with a mixture of 9 parts of dichlorotetrafluoroethane and 1 part of dichlorodifluoromethane.

| Components | Compositions | | |
|---|---|---|---|
| | A | B | C |
| Polyoxyethylated high molecular weight fatty alcohol | 3 | 3 | 3 |
| Polyoxyethylene sorbitan monooleate | 1 | 1 | 1 |
| Ethyl vanillin | 0.1 | — | — |
| Ascorbyl palmitate | — | 0.1 | — |
| Potassium sorbate | — | — | 0.1 |
| Candicidin | 0.21 | 0.21 | 0.21 |
| Propylene glycol q.s. ad. | 100 | 100 | 100 |
| Initial Candicidin assay (mg/gm) | 3.68 | 3.21 | 3.69 |
| 1 Month at room temperature (mg/gm) | 3.16 | 2.05 | 3.06 |
| 1 Month at 4°C. (mg/gm) | 3.75 | 3.76 | 4.00 |
| 2 Months at room temperature (mg/gm) | 2.79 | — | 2.11 |
| 2 Months at 4°C. (mg/gm) | 2.76 | 2.61 | 4.49 |

EXAMPLE 8

The following Example illustrates aerosol foam formulations of candicidin in a propylene glycol vehicle using various amounts of propyl gallate as an antioxidant. All of the compositions were gassed using a mixture of 9 parts of dichlorotetrafluoroethane and 1 part of dichlorodifluoromethane.

| Components | Compositions | | | | |
|---|---|---|---|---|---|
| | A | B | C | D | E |
| Polyoxyethylated high molecular weight fatty alcohol | 6 | 6 | 9 | 6 | 6 |
| Polyoxyethylene sorbitan monooleate | 2 | 2 | 3 | 2 | 2 |
| Propyl gallate | 0.1 | 2.0 | 0.3 | — | — |
| Potassium sorbate | — | — | — | — | 0.2 |
| Candicidin | 0.42 | 0.42 | 0.63 | 0.42 | — |
| Propylene glycol q.s. ad. | 200 | 200 | 300 | 200 | 200 |
| Initial Candicidin assay (mg/gm) | 4.24 | 3.92 | 3.67 | 3.36 | 0 |
| 3 Months at room temperature (mg/gm) | 2.81 | — | 2.31 | — | — |
| 3 Months at 4°C. (mg/gm) | 4.52 4.06 | 4.27 | 3.23 | — | — |
| 6 Months at 4°C. (mg/gm) | 4.12 | 4.12 | 3.89 | — | — |
| 10½ months at 4°C. (mg/gm) | 3.38 | 2.93 | 3.65 | <2.7 | — |

EXAMPLE 9

The following Example illustrates variations in the propellants, nonionic surfactants and amount of candicidin used.

| Components | Compositions | | | |
|---|---|---|---|---|
| | A | B | C | D |
| Polyoxyethylated high molecular weight stearyl alcohol | 2.7 | 2.7 | 2.7 | 2.7 |
| Polyoxyethylene sorbitan monooleate | 0.9 | 0.9 | — | 0.9 |
| Propyl gallate | 0.09 | 0.09 | 0.09 | 0.05 |
| Sorbitan monooleate | — | — | 0.9 | — |
| Candicidin | 0.38 | 0.38 | 0.38 | 0.27 |
| Dichlorotetrafluoroethane | — | 10 | — | 10 |
| Dichlorotetrafluoroethane to dichlorodifluoromethane (9:1) 10 | 10 | — | 10 | — |
| Propylene glycol q.s. ad. | 100 | 100 | 100 | 100 |

I claim:
1. An anhydrous, aerosol foam composition useful in the treatment of vaginitis consisting of:
   a. from 0.2 to 0.5% by weight of Candicidin;
   b. from 2 to 5% by weight of a nonionic, waxy, foaming agent prepared by reacting ethylene oxide with stearyl alcohol, having a melting range of 48°–52° C., a maximum iodine value of 3.5 and a maximum saponification value of 14;
   c. from 0.5 to 2.0% by weight of polyoxyethylene (20) sorbitan monooleate;
   d. from 0.05 to 1.0% by weight of propyl gallate;
   e. from 5.0 to 20.0% by weight of an aerosol propellant selected from the group of chlorofluorohydrocarbons having a boiling point between −30° C. and 30° C; and
   f. propylene glycol
2. An anhydrous, aerosol foam composition useful in the treatment of vaginitis consisting of:
   a. from 0.2 to 0.5% by weight of Candicidin;
   b. from 2 to 5% by weight of a nonionic, waxy, foaming agent prepared by reacting ethylene oxide with stearyl alcohol, having a melting range of 48°–52° C., a maximum iodine value of 3.5 and a maximum saponification value of 14;
   c. from 0.5 to 2.0% by weight of sorbitan monooleate;

d. from 0.05 to 1.0% by weight of propyl gallate;
e. from 5.0 to 20.0% by weight of an aerosol propellant selected from the group of chlorofluorohydrocarbons having a boiling point between −30° C. and 30° C.; and
f. propylene glycol.

3. An anhydrous, aerosol foam composition useful in the treatment of vaginitis which consists of:

|  | % by weight |
|---|---|
| (a) Candicidin | 0.38 |
| (b) a nonionic, waxy, foaming agent prepared by reacting ethylene oxide with stearyl alcohol, having a melting range of 48–52° C., a maximum iodine value of 3.5 and a maximum saponification value of 14 | 2.7 |
| (c) polyoxyethylene (20) sorbitan monooleate | 0.9 |
| (d) propyl gallate | 0.09 |
|  | % by weight |
| (e) a 9:1 mixture of dichlorotetrafluoroethane and dichlorodifluoromethane propellants | 10.0 |
| (f) propylene glycol | 85.93. |

* * * * *

UNITED STATES PATENT AND TRADEMARK OFFICE
CERTIFICATE OF CORRECTION

PATENT NO. : 3,929,985
DATED : December 30, 1975
INVENTOR(S) : Norval Ellsworth Webb, Jr.   Page 1 of 2

It is certified that error appears in the above-identified patent and that said Letters Patent are hereby corrected as shown below:

Column 3, line 20, the patent reads "serbitan" and should read --sorbitan--;

Column 6, lines 30-31, under the following heading:

|  | Components | Compositions | | | |
|---|---|---|---|---|---|
|  |  | A | B | C | D |
| the patent reads: | "sorbitol" |  |  |  |  |
|  | "1 | 1 | 1 | 1" |  |
| and should read: | --sorbitol | 1 | 1 | 1 | 1-- |

Column 8, line 12, under the following heading:

|  | Components | Compositions | | | | |
|---|---|---|---|---|---|---|
|  |  | A | B | C | D | E |
| the patent reads: | "(mg/gm)4.52 | 4.06 | 4.27 | 3.23 | --" |  |
| and should read: | --(mg/gm) | 4.52 | 4.06 | 4.27 | 3.23 | -- -- |

UNITED STATES PATENT AND TRADEMARK OFFICE
CERTIFICATE OF CORRECTION

PATENT NO. : 3,929,985
DATED : December 30, 1975
INVENTOR(S) : Norval Ellsworth Webb, Jr.

It is certified that error appears in the above—identified patent and that said Letters Patent are hereby corrected as shown below:

Column 8, lines 37-38, under the following heading:

|  | Components | Compositions | | | |
|---|---|---|---|---|---|
|  |  | A | B | C | D |
| the patent reads: | "(9:1)" |  |  |  |  |
|  | "10" | -- | 10 | --" |  |
| and should read: | --(9:1) | 10 | -- | 10 | -- -- |

Signed and Sealed this

Thirty-first Day of August 1976

[SEAL]

Attest:

RUTH C. MASON
Attesting Officer

C. MARSHALL DANN
Commissioner of Patents and Trademarks